United States Patent
Lane et al.

(10) Patent No.: US 6,244,465 B1
(45) Date of Patent: Jun. 12, 2001

(54) PRESSURE SYSTEM FOR DISPENSING FLUID FROM A CONTAINER

(75) Inventors: Michael L. Lane, Arvada, CO (US); Sian Bronwyn Gastall, Toddington (GB)

(73) Assignee: Quoin Industrial, Inc., Golden, CO (US)

(*) Notice: Subject to any disclaimer, the term of this patent is extended or adjusted under 35 U.S.C. 154(b) by 0 days.

(21) Appl. No.: 09/604,613

(22) Filed: Jun. 27, 2000

(51) Int. Cl.$^7$ ........................................ G01F 11/00
(52) U.S. Cl. .............................. 222/1; 222/386.5
(58) Field of Search ................... 222/386.5, 394, 222/399, 1

(56) References Cited

U.S. PATENT DOCUMENTS

| | | | |
|---|---|---|---|
| 3,718,236 | 2/1973 | Reyner et al. | 222/386.5 |
| 4,360,131 | 11/1982 | Reyner | 222/386.5 |
| 4,513,884 | 4/1985 | Magid | 222/94 |
| 4,739,901 | 4/1988 | Dorfman et al. | 222/1 |
| 4,785,972 | 11/1988 | LeFevre | 222/1 |
| 4,867,348 | 9/1989 | Dorfman | 222/173 |
| 4,919,310 | 4/1990 | Young et al. | 222/386.5 |
| 4,923,095 | 5/1990 | Dorfman et al. | 222/386.5 |
| 5,050,806 | 9/1991 | Anderson et al. | 222/464 |
| 5,333,763 | 8/1994 | Lane et al. | 222/386.5 |
| 5,769,282 | 6/1998 | Lane et al. | 222/386.5 |
| 6,164,492 | * 12/2000 | Lane et al. | 222/386.5 |

OTHER PUBLICATIONS

U.S. Patent Application Serial No. 09/334,737 filed Jun. 17, 1999 for "Readily Deformable Pressure System For Dispensing Fluid From A Container" of Lane et al.

U.S. Patent Application Serial No. 09/362,483 filed Jul. 28, 1999 for "Method And Apparatus For Dispensing A Liquid Containing Gas In Solution" of Whitney et al.

U.S. Patent Application Serial No. 09/535,338 filed Mar. 24, 2000 for "Apparatus And Method For Variably Restricting Flow In A Pressurized Dispensing System" of Lane et al.

* cited by examiner

*Primary Examiner*—Kevin Shaver
*Assistant Examiner*—Patrick Buechner
(74) *Attorney, Agent, or Firm*—Klaas, Law, O'Meara & Malkin, P.C.; Michael A. Goodwin, Esq.

(57) ABSTRACT

A system for pressurizing a dispensing container, such as a beverage dispensing container, may be in the form of a pressure pouch package which includes an outer pouch and an inner pouch. The inner pouch may be a pressure pouch having multiple compartments and components of an at least two component gas generating system contained within the compartments. The outer pouch may be sized so that it will not open when the pressure pouch is initially activated but will only open after a first quantity of product is dispensed from the dispensing container. In this manner, the outer pouch serves to maintain the folded configuration of the pressure pouch until after a first quantity of product is first dispensed from the container. This, in turn, prevents entrapment of the pressure pouch reactive components from occurring. The outer pouch also serves to prevent the pressure pouch from coming into contact with the product until after a first quantity of product is first dispensed from the container. Accordingly, the necessary gas barrier properties may be shifted from the pressure pouch to the outer pouch, which has a relatively simpler structure.

23 Claims, 11 Drawing Sheets

PRESSURE SYSTEM FOR DISPENSING FLUID FROM A CONTAINER

FIELD OF THE INVENTION

The present invention relates generally to self pressurized dispensing systems and methods and, more particularly, to a pressure generating system for use in conjunction with such dispensing systems and methods.

BACKGROUND OF THE INVENTION

Flowable materials are commonly dispensed from pressurized containers. In many such containers, a gaseous propellant is mixed with the flowable material product, thus providing the motive force to expel the product from the container. One example of such a container is an aerosol can in which a propellant gas is provided to drive a liquid or an atomized gas-liquid mixture product from the container. In such containers, the initial pressure within the container often declines as the product is dispensed.

Although this type of pressurization system works adequately with some products, in many applications it is undesirable to mix the propellant gas with the product being dispensed. Such mixing may result in undesirable reactions between the product and the propellant, thus leading to a degradation of the product.

It is also undesirable to dispense many products with a declining pressure dispensing system. This is particularly true with carbonated liquid products, such as beer. It has been found that successfully dispensing carbonated liquids depends, in part, upon maintaining a predetermined relatively constant pressure differential between the inside of the container and the ambient environment. In a declining pressure dispensing system, this is generally not possible.

To overcome the problems discussed above, a pressurization system has been developed in which an expansible pressure pouch is placed within the product container. The pressure pouch includes a plurality of chemicals contained in a series of compartments within the pouch. When mixed together, the chemicals in the pouch generate gas and pressure, thus expanding the pouch and providing pressure to drive the product from the container. As product is dispensed from the container, the pouch expands, causing more compartments to open. This, in turn, causes the introduction and mixing of more gas-generating chemicals and, thus, the development of more pressure within the container. The expansible pouch, thus, provides the dual functions of separating the propellant gas from the product and of maintaining a relatively constant pressure profile within the container.

Examples of dispensing systems and components thereof useable in conjunction with expansible pressure pouches are described in U.S. Pat. No. 5,050,806 to Anderson et al.; U.S. Pat. No. 4,739,901 to Dorfman et al.; U.S. Pat. No. 4,867,348 to Dorfman; U.S. patent application Ser. No. 09/362,483 filed Jul. 28, 1999, of Lowell T. Whitney et al. for METHOD AND APPARATUS FOR DISPENSING A LIQUID CONTAINING GAS IN SOLUTION; U.S. Pat. No. 6,164,492 to Michael L. Lane et al. for READILY DEFORMABLE PRESSURE SYSTEM FOR DISPENSING FLUID FROM A CONTAINER and U.S. patent application Ser. No. 09/535,338 filed Mar. 24, 2000 of Michael L. Lane et al. for APPARATUS AND METHOD FOR VARIABLY RESTRICTING FLOW IN A PRESSURIZED DISPENSING SYSTEM, which are all hereby specifically incorporated by reference for all that is disclosed therein.

Expansible pressure pouches may be formed by juxtaposing two sheets of flexible plastic material. The pouch compartments discussed above may be formed by releasably attaching one sheet to the other at selected seam locations, e.g., via a heat sealing technique. As the pouch expands, each releasable seam may be opened or peeled in a sequential manner to release more gas-generating chemical in a manner as described above. Examples of such expansible pressure pouches using peelable seam technology are disclosed in U.S. Pat. No. 4,785,972 to LeFevre; U.S. Pat. No. 4,919,310 to Young et al.; U.S. Pat. No. 4,923,095 to Dorfman et al. and U.S. Pat. No. 5,333,763 to Lane et al., which are all hereby specifically incorporated by reference for all that is disclosed therein.

As an alternative to peelable seams, the compartments of some pressure pouches are separated by frangible wall portions which fail or tear in response to increasing volume of an adjacent compartment. An example of a pressure pouch using such frangible divider wall portions is disclosed in U.S. Pat. No. 5,769,282 to Lane et al. which is hereby specifically incorporated by reference for all that is disclosed therein.

In either type of pressure pouch described above, the plastic film used to form the pressure pouch must be capable of performing several functions. First, the outer surfaces of the film (i.e., the surface of the film that will form the outer surface of the pressure pouch) must be compatible with the product to be dispensed from the container. This means that the outer surfaces must be generally non-reactive with the product and, in the case of food products, that they not impart any appreciable flavor to the product.

In most cases, the film must also be relatively gas-impermeable in order to prevent the pressurizing gases generated within the pressure pouch from migrating into and mixing with the product in the container. The film also must be capable of forming reliable permanent seams in order to seal the outer periphery of the pressure pouch.

In the case of a peelable seam type pressure pouch, the film used to form the pouch must additionally be capable of forming reliable peelable seams. For successful operation of a peelable seam type pressure pouch, the peelable seams must be formed such that a specific and narrow range of force will cause opening of the peelable seams. If the peelable seams are formed with too much strength, they may, in essence, become permanent seams. If this occurs, the peelable seams may fail to separate or may tear the plastic layers when the pressure pouch is activated, in either case resulting in a defective pressure pouch. If the peelable seams are formed with too little strength, they may open prematurely, possibly leading to premature activation of the pouch or in defective operation thereof.

In a typical pressure pouch dispensing system, the dispensing container is generally first filled with a flowable product to be dispensed from the container. The pressure pouch is then inserted into the dispensing container and submerged within the flowable product contained therein. The container is then sealed, e.g., by attaching a valve assembly to the container opening.

The above operations generally take place with the container in a vertical orientation, i.e., with the container opening facing upwardly. Typically, filled dispensing containers are also shipped in a vertical orientation.

After the container is sealed, the pressure pouch is activated, thus applying pressure to the product in the container. This pressure is used to force product from the container when it is desired to dispense product from the container. In the case where the container is used for a gas-containing flowable product, this pressure also serves to maintain the gas in solution. After the pressure pouch is activated, any gas headspace trapped within the container may be bled off, for example, by opening the valve assembly. Alternatively, the gas headspace may be left in the container. If left in the container, the gas headspace may eventually be forced into solution within the flowable product by the pressure supplied by the pressure pouch.

As mentioned above, filling and shipping operations generally occur with the dispensing container in a vertical orientation. The container is generally, however, placed in a horizontal orientation, i.e., with the container opening and valve assembly facing horizontally, when it is desired to dispense product from the container.

Before a pressure pouch dispensing system is used for the first time (i.e., before any fluid is dispensed from the container), the pressure pouch, although activated, is in a relatively unexpanded condition. In other words, the fluid in the container occupies a relatively large volume while the pressure pouch occupies a relatively small volume. As product is dispensed from the container, this situation tends to reverse; as fluid is dispensed from the container, the volume of fluid in the container decreases, and the volume of the pressure pouch expands.

In order for all of the fluid to be expended from the container, it is necessary that the pressure pouch be capable of substantially conforming to the shape of the container when the pressure pouch is fully expanded. As can be appreciated, in order to achieve this, it is necessary for the pressure pouch, in its initial unexpanded condition, to have a length that is longer than the available length within the container.

Thus, when the pressure pouch is first inserted into the container (i.e., before the pressure pouch is activated and the container sealed), the length of the pressure pouch is longer than the available length of the container. In order to fit the relatively longer pressure pouch into the relatively shorter container, it is conventional to fold the pressure pouch about a fold line prior to installing the pressure pouch into the container.

The pressure pouch, in its initial configuration, also typically has a greater width than the width of the container opening. Accordingly, in order to fit the pouch through the container opening, it is conventional to also fan-fold the pouch prior to installing the pressure pouch into the container.

With the pressure pouch folded in this manner, it will fit completely within the available space inside the container. Folding of the pouch is also important to assure that the pressure pouch deploys properly during product dispensing.

Pressure pouches are commonly manufactured at a location which is remote from the location at which dispensing containers are filled. Furthermore, pressure pouches are typically manufactured in bulk and stored for future use. In order to ensure that pressure pouches are properly folded, as described above, and that the folding is maintained until it is time for the pouch to be inserted into a container, it is conventional to place each pressure pouch within an outer shipping pouch immediately after the pressure pouch is folded.

When it is time to insert the pressure pouch into a dispensing container, the shipping pouch may be cut open and positioned above the open end of the filled container. Thereafter, the pressure pouch may be allowed to slide out of the shipping pouch and drop into the container. The shipping pouch, which does not enter the container, may then be discarded.

The shipping pouch, thus, serves to maintain the proper folded configuration of the pressure pouch until it is inserted into the container. The shipping pouch may also function to preserve the sterility of the pressure pouch. Specifically, the pressure pouch may be sterilized after being manufactured. It may then be folded in a sterile environment and then sealed within the shipping pouch. The sterility of the pressure pouch, thus, is preserved by the shipping pouch.

Although the above described pressure pouch and shipping pouch generally work well, it has been found that, under some circumstances, some of the reactive components within the pressure pouch can become trapped by the pouch fold when the container is in its vertical filling orientation. This may result in there not being enough reactive component to completely react and, thus, in improper operation of the pressure pouch.

Accordingly, it would be generally desirable to provide an apparatus and method which overcomes these problems associated with flowable product dispensing pressure systems.

SUMMARY OF THE INVENTION

The present invention is directed to a system for pressurizing a dispensing container, such as a beverage dispensing container. The system may be in the form of a pressure pouch package which includes an outer pouch and an inner pouch. The outer pouch may be formed from a single sheet of plastic material which is folded and sealed to itself via peelable heat seams. Accordingly, the peelable heat seams of the outer pouch will open when a sufficient level of force is applied.

The inner pouch may be a pressure pouch having multiple compartments and components of an at least two component gas generating system contained within the compartments. The inner pouch may be folded, rolled and sealed within the outer pouch.

The pressure pouch package may be inserted into a dispensing container along with a product to be dispensed from the container. The container may then be sealed and the pressure pouch activated such that pressure is applied to the product. The outer pouch may be sized so that it will not open when the pressure pouch is initially activated but will only open after a first quantity of product is dispensed from the container. Specifically, the outer pouch may be sized such that its maximum volume will be slightly larger than the initial gas headspace within the container. In this manner, the outer pouch serves to maintain the folded and rolled configuration of the pressure pouch until the gas head space is bled off or dissolved into the product and until after a first quantity of product is first dispensed from the container. The outer pouch, thus, serves to prevent the pressure pouch from coming into contact with the product until after a first quantity of product is first dispensed from the container. Accordingly, the necessary gas barrier properties may be shifted from the pressure pouch to the outer pouch. This is advantageous since the outer pouch has a smaller area than the pressure pouch and the amount of relatively expensive gas barrier material necessary may, thus, be reduced. Shifting the gas barrier properties to the outer pouch is further advantageous in that the outer pouch has a simpler structure relative to the pressure pouch. Accordingly, it is easier to incorporate the gas barrier properties into the outer pouch than into the pressure pouch.

DETAILED DESCRIPTION OF THE INVENTION

Figure 1:
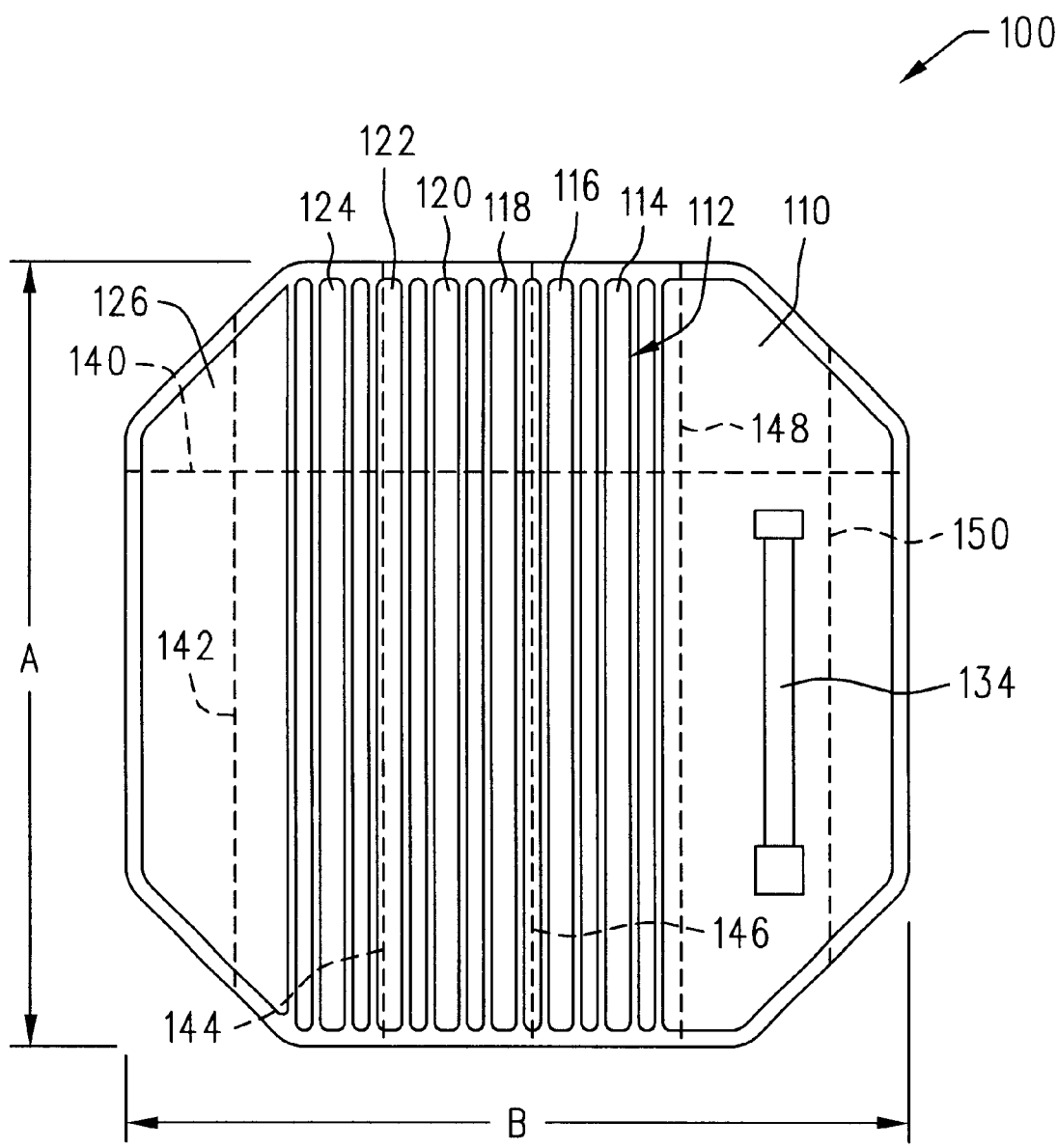
FIG. 1 is a top plan view of a prior art pressure pouch.

FIGS. 3–11 generally illustrate a dispensing system 400 for dispensing a fluid 412. The dispensing system 400 may include a container 410, a quantity of fluid 412 in the container 410, an openable outer pouch 300 in the container 410 and at least partially in contact with the quantity of fluid and an inner pouch 200. The inner pouch may have a plurality of openable compartments 210, 212 containing components of an at least two-component gas generating system. The dispensing system 400 may include at least a first operating condition and a second operating condition. In the first operating condition, the outer pouch 300 is in a closed condition and the inner pouch 200 is sealed within the outer pouch 300. In the second operating condition, the outer pouch 300 is in an open condition and at least one of the inner pouch compartments 210, 212 is in an unopened condition.

FIGS. 3–11 further illustrate, in general, a method for dispensing fluid 412 from a container 410. The method includes providing a quantity of the fluid 412 in the container 410, providing a first openable pouch 300 in the container 410 and at least partially in contact with the quantity of the fluid 412 and providing a second pouch 200 located within the first openable pouch 300. The second pouch 200 may have a plurality of openable compartments 210, 212 containing components of an at least two-component gas generating system. The method further includes dispensing some of the quantity of fluid 412 from the container 410, causing the first openable pouch 300 to open and causing at least one of the second pouch compartments 210, 212 to open after causing the first openable pouch 300 to open.

FIGS. 3–11 further illustrate, in general, a pressure pouch package 250 suited for use in combination with a dispensing container 410. The pressure pouch package 250 may include an outer pouch 300 and an inner pouch 200 having at least first and second compartments 210, 212 and containing components of an at least two-component gas generating system. The inner pouch 200 may be located within the outer pouch 300. None of the components of the at least two-component gas generating system are located between the outer pouch 300 and the inner pouch 200.

FIGS. 3–11 further illustrate, in general, a pressure pouch package 250 suited for use in combination with a dispensing container 410. The pressure pouch package 250 may include an outer pouch 300 and an inner pouch having at least first and second compartments 210, 212 and containing components of an at least two-component gas generating system. The inner pouch 200 is located within the outer pouch 300. The outer pouch 300 is formed from at least one first material. The inner pouch 200 is formed from at least one second material. The at least one first material has a greater ability to inhibit the migration of gas thereacross than does the at least one second material.

Having thus described the apparatus and method in general, they will now be described in further detail.

FIG. 1 illustrates a pouch 100 which may include a series of compartments containing components of an at least two-component gas generating system. Specifically, the pouch 100 may have a relatively large first compartment 110 and a plurality of secondary compartments 112, such as the secondary compartments 114, 116, 118, 120, 122, 124, 126 as shown. First compartment 110 may contain a quantity of a first component of a two-component gas generating system. The secondary compartments 112 may each contain a quantity of the second component of the two component gas generating system. A triggering device 134, located in the compartment 110, may contain a quantity of the second component of the two-component gas generating system. The pouch 100 may, for example, be the type disclosed in U.S. Pat. No. 5,769,282, previously referenced.

It is noted that, although FIG. 1 shows the pouch 100 in its completed configuration, the quantities of the gas generating components which would ordinarily be contained in the compartments 110 and 112 have been omitted for illustration purposes. The pouch 100 is illustrated in FIG. 1 in a collapsed configuration in which the compartments 110, 112 are empty. It is to be understood, however, that normally, the completed pouch 100 would contain quantities of the gas generating components as described above.

Figure 2:
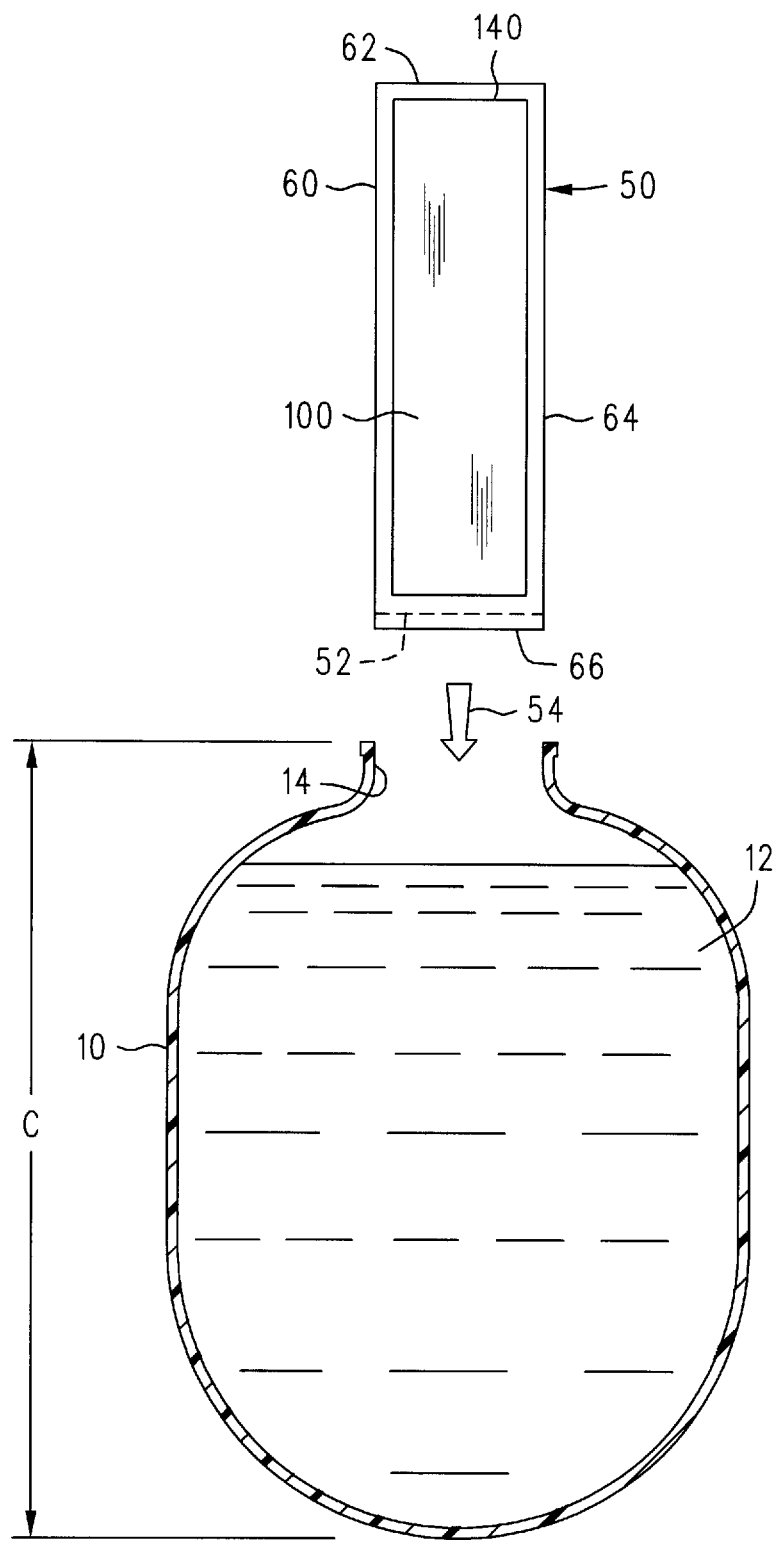
FIG. 2 is a side elevation view, in partial cross-section, of a prior art dispensing container and the pressure pouch of FIG. 1, folded and enclosed within a prior art shipping pouch.

In a typical pressure pouch dispensing system, the dispensing container 10, FIG. 2, is generally first filled with a flowable product 12 to be dispensed from the container 10. The pressure pouch 100 is then inserted into the dispensing container 10 and submerged within the flowable product 12 contained therein. The container 10 is then sealed, e.g., by attaching a valve assembly to the container opening 14. The above operations generally take place with the container in a vertical orientation, i.e., with the container opening 14 facing upwardly. Typically, filled dispensing containers are also shipped in a vertical orientation.

After the container 10 is sealed, the pressure pouch 100 is activated (e.g., by activating the trigger 134, FIG. 1), thus applying pressure to the product 12 in the container 10. This pressure is used to force product from the container 10 when it is desired to dispense product from the container. In the case where the container 10 is used for a gas-containing flowable product, this pressure also serves to maintain the gas in solution. After the pressure pouch 100 is activated, any gas headspace trapped within the container may be bled off, for example, by opening the valve assembly.

Alternatively, the gas headspace may be left in the container. If left in the container, the gas headspace may eventually be forced into solution within the flowable product by the pressure supplied by the pressure pouch 100.

As mentioned above, filling and shipping operations generally occur with the dispensing container 10 in a vertical orientation. The container 10 is generally, however, placed in a horizontal orientation, i.e., with the container opening 14 and valve assembly facing horizontally, when it is desired to dispense product from the container.

Before a pressure pouch dispensing system is used for the first time (i.e., before any fluid is dispensed from the container 10), the pressure pouch 100, although activated, is in a relatively unexpanded condition. In other words, the fluid 12 in the container occupies a relatively large volume while the pressure pouch 100 occupies a relatively small volume. As product is dispensed from the container, this situation tends to reverse; as fluid is dispensed from the container 10, the volume of fluid 12 in the container decreases, and the volume of the pressure pouch 100 expands.

In order for all of the fluid 12 to be expended from the container 10, it is necessary for the pouch 100 to be capable of substantially conforming to the shape of the container 10 when the pouch 100 is fully expanded. As can be appreciated, in order to achieve this, it is necessary for the pouch, in its initial unexpanded condition, to have a length "A", FIG. 1, that is longer than the available length "C" within the container 10, FIG. 2.

Thus, when the pouch 100 is first inserted into the container 10 (i.e., before the pouch 100 is activated and the container 10 sealed), the length "A" of the pouch 100 is longer than the available length "C" of the container 10. In order to fit the relatively longer pouch 100 into the relatively shorter container 10, it is conventional to fold the pouch 100 about a fold line 140, FIG. 1, prior to installing the pouch into the container 10. With reference to FIG. 1, the pouch 100 may, for example, be folded about the fold line 140 such that the upper portion of the pouch 100 is folded behind the lower portion, as viewed in FIG. 1. Folded in this manner, the pouch 100 is now short enough to fit within the container.

As can be appreciated with respect to FIGS. 1 and 2, the width "B" of the pouch 100 is too large to allow the pouch to be inserted through the opening 14 of the container 10. Accordingly, it is conventional to fan-fold the pouch 100 along the fold lines 142, 144, 146, 148, 150, FIG. 1, after folding the pouch along the fold line 140 as previously described.

With the pouch 100 fully folded in this manner, it will pass through the container opening 14 and will fit completely within the available space inside the container 10. Pressure pouches, such as the pouch 100 previously described, are commonly manufactured at a location which is remote from the location at which dispensing containers, such as the container 10 previously described, are filled. Furthermore, pouches are typically manufactured in bulk and stored for future use. In order to ensure that pressure pouches are properly folded, as described above, and that the folding is maintained until it is time for the pouch to be inserted into a container, it is conventional to place each pressure pouch within an outer shipping pouch immediately after the pressure pouch is folded.

FIG. 2 illustrates such a shipping pouch 50 with a folded pressure pouch 100 therewithin. As described above, the pressure pouch 100 may be sealed within the shipping pouch 50 after the pressure pouch 100 is folded. When it is time to insert the pressure pouch 100 into a dispensing container 10, the shipping pouch may be cut along a line 52 (e.g., with a pair of scissors). The shipping pouch may then be positioned above the filled, open container 10 as illustrated in FIG. 2. Thereafter, the pressure pouch 100 may be allowed to slide out of the shipping pouch 50 and drop into the container 10 as illustrated by the arrow 54. The shipping pouch, which does not enter the container 10, may then be discarded.

The shipping pouch 50, thus, serves to maintain the proper folded configuration of the pressure pouch until it is inserted into the container. The shipping pouch 50 also serves to ensure that the pouch is inserted into the container 10 in the proper orientation, i.e., with the fold 140 at the top. The shipping pouch 50 may also function to preserve the sterility of the pouch 100. Specifically, the pouch 100 may be sterilized after being manufactured. It may then be folded in a sterile environment and then sealed within the shipping pouch 50. The sterility of the pouch, thus, is preserved by the shipping pouch 50.

The shipping pouch 50 may, for example, be formed from single sheet of polyethylene plastic material. Referring again to FIG. 2, the single sheet may first be folded about the edge 62. The closed edges 60 and 64 may then be formed by permanently sealing the two layers of the sheet to itself along the edges 60 and 64, for example, using a conventional heat sealing process. After the closed edges 60 and 64 are formed, the pressure pouch 100 may be inserted into the shipping pouch 50 through the open end 66. After inserting the pressure pouch 100, the open end 66 of the shipping pouch 50 may be permanently sealed, e.g., via a heat sealing operation.

Figure 8:
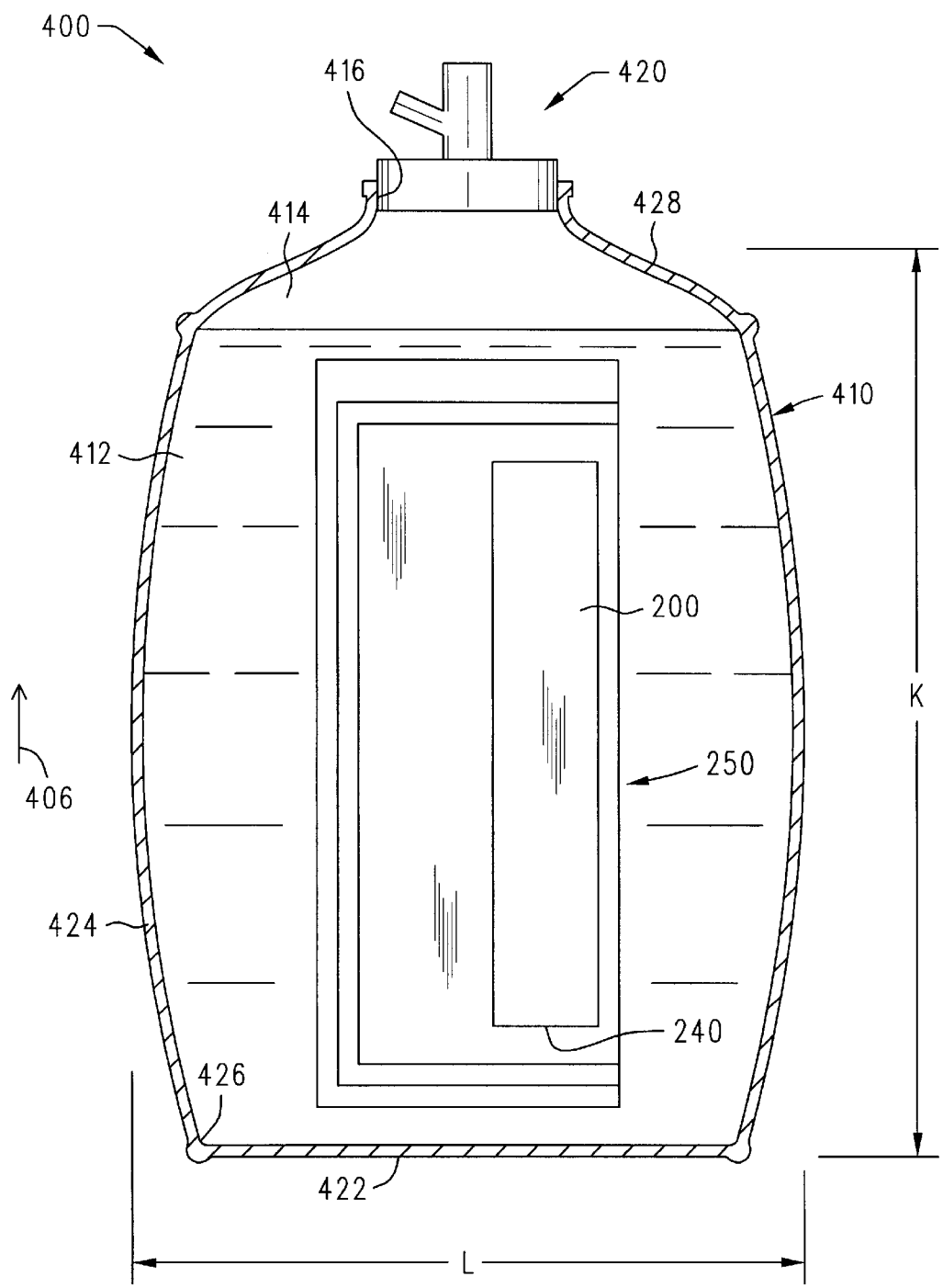
FIG. 8 is a side elevation view, in partial cross-section, of an improved dispensing system including the pressure pouch package of FIG. 4 sealed within a container before the pressure pouch is activated.

As described above, when a container such as the container 10 is used, the pressure pouch 100 is typically inserted into the container 10 with the fold 140 at the top (i.e., as generally shown in FIG. 2). Some containers, however, have a different configuration than the container 10 and, as a result, require that the pressure pouch be inserted with the fold oriented toward the bottom of the container. An example of such a container having a different configuration is illustrated in FIG. 8. The container 410 illustrated in FIG. 8 may, for example, be a three-piece metal container. Specifically, the container 410 may include a sidewall 424, a top wall 428 and an oppositely disposed bottom wall 422. Top and bottom walls 428, 422 may be seamed to the sidewall 424 in a conventional manner. The container 410 may have an overall height "K" and an overall diameter "L". The height "K" may, for example, be about 11 inches. The diameter "L" may, for example, be about 6.5 inches.

Referring again to FIG. 8, the top wall 428 of the container 410 may have a slightly curved profile. This slightly curved profile facilitates full contact between a pressure pouch and the inner surface of the container 410 in the area of the top wall 428 when the pressure pouch is fully expanded. Such full contact between the pressure pouch and the inner surface of the container is necessary in order to expel all of the product from the container and, thus, is essential to proper operation of a pressure pouch dispensing system.

In contrast to the curved top wall 428, the bottom wall 422 of the container 410 may be substantially flat. As a result of the flatness of the bottom wall 422, the intersection between the sidewall 424 and the bottom wall 422 forms a relatively sharp angle corner area 426. This corner area 426 represents an area where it is relatively difficult to obtain full contact between the pressure pouch and the inner surface of the container. To address this difficulty, it is desirable to locate more pressure pouch material near the bottom wall 422 of the container and, thus, near the corner area 426. This extra pressure pouch material allows the pressure pouch to fully conform to the sharp angle shape of the corner area 426.

In order to locate more pressure pouch material near the corner area 426, the pressure pouch may be inserted into the container 410 with the fold, e.g., the fold 140 previously described with respect to the pouch 100, located toward the bottom wall 422 of the container. FIG. 8 illustrates a pressure pouch 200, as will be described in further detail herein, with its fold line 240 oriented toward the bottom of the container.

Although orienting the pouch fold toward the bottom of the container allows the pouch to fully expand into the corner area 426 of the container 410, it has been found that orienting the pouch in this manner can, in some circumstances, cause some of the reactive components within the pressure pouch to become trapped by the pouch fold when the container is in its vertical filling orientation.

Specifically, due to the force of gravity, the reactive components flow to the bottom of the pressure pouch and a portion of the reactive component contained within the pressure pouch compartments may become trapped on the opposite side of the fold from the remainder of the reactive component. This may result in there not being enough reactive component to completely react and, thus, in improper operation of the pressure pouch.

The entrapment of reactive component described above is able to occur because the pressure pouch, after being inserted into the container, can begin to unfold within the container. Specifically, the pressure pouch fold, e.g., the fold 140, FIG. 1, may begin to unfold and reactive component within the pressure pouch compartments can move around the fold line and become trapped. This movement around the fold line is generally not possible when the pouch is in a tightly folded configuration, e.g., when the pouch 100 is housed within the shipping pouch 50.

It has been found that the problem described above can be alleviated if the pressure pouch is maintained in its tightly folded configuration until the container is turned to the horizontal dispensing orientation. An improved pressure pouch system has been developed to accomplish this objective, as will now be described in detail.

Figure 3:
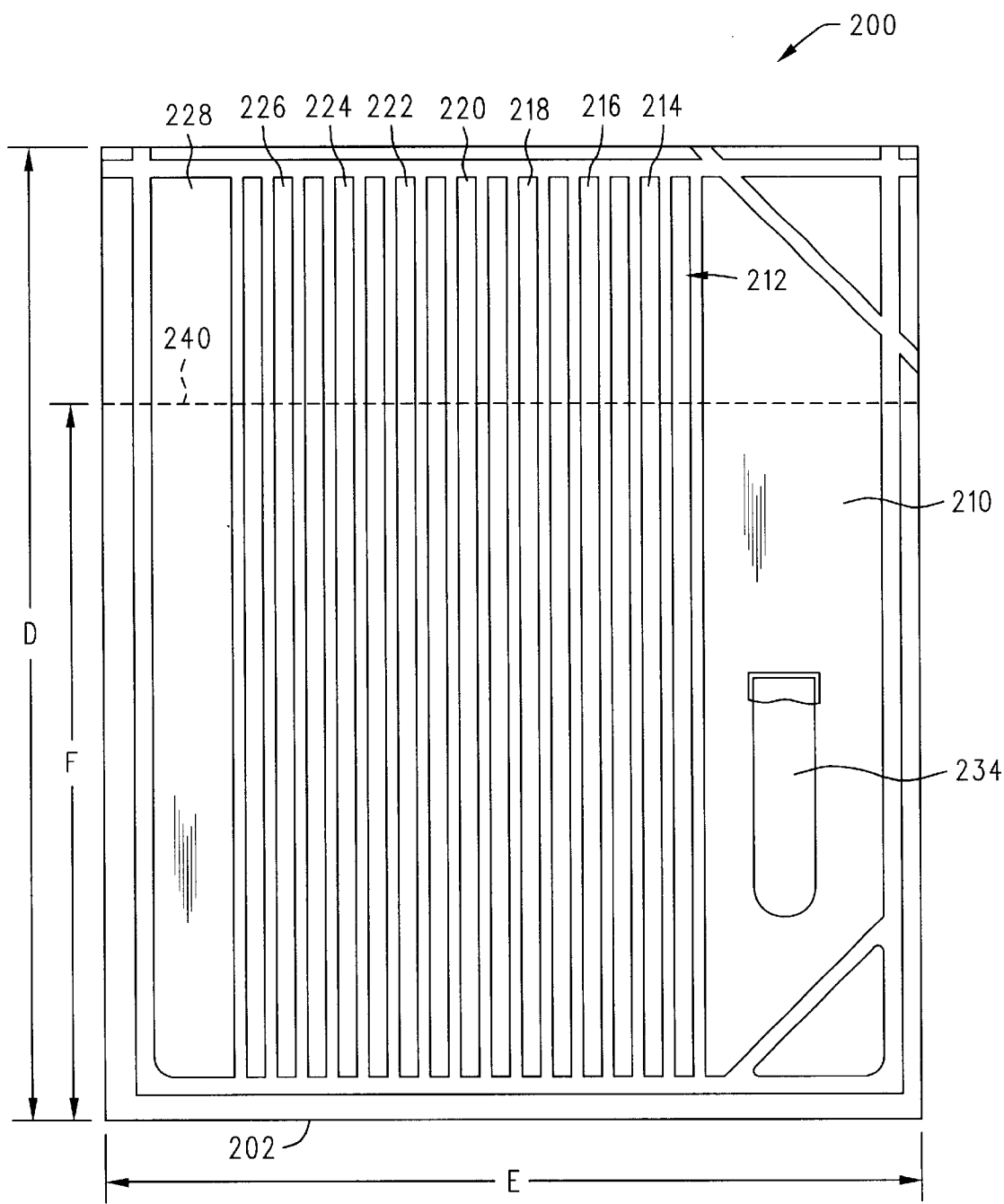
FIG. 3 is a top plan view of an improved pressure pouch.

Referring to FIG. 3, a pressure pouch 200 is illustrated. The pressure pouch 200 may include a series of compartments containing components of an at least two-component gas generating system. Specifically, the pouch 200 may have a relatively large first compartment 210 and a plurality of secondary compartments 212, such as the secondary compartments 214, 216, 218, 220, 222, 224, 226 and 228, as shown. First compartment 210 may contain a quantity of a first component of a two-component gas generating system. The secondary compartments 212 may each contain a quantity of the second component of the two component gas generating system. A triggering device 234, located in the compartment 210, may contain a quantity of the second component of the two-component gas generating system. The pouch 200 may, for example, have an overall height "D" of about 15 inches and an overall width "E" of about 10.75 inches. A flowtube 230, FIGS. 5–7, may also be provided in a conventional manner. The flowtube 230, however, is omitted from the illustration in FIG. 3 for purposes of illustration clarity.

It is noted that, although FIG. 3 shows the pouch 200 in its completed configuration, the quantities of the gas generating components which would ordinarily be contained in the compartments 210 and 212 have been omitted for illustration purposes. The pouch 200 is illustrated in FIG. 3 in a collapsed configuration in which the compartments 210, 212 are empty. It is to be understood, however, that normally, the completed pouch 200 would contain quantities of gas generating components as described above.

The pouch 200 is shown and described as being a frangible wall type pressure pouch and may, for example, be of the general type disclosed in U.S. Pat. No. 6,164,492, previously referenced. It is noted, however, that this depiction of the pouch 200 is provided for illustration purposes only. The pouch could, alternatively, be any type of pressure pouch, e.g., a peelable seam pressure pouch or a differently configured frangible wall pressure pouch.

Figure 4:
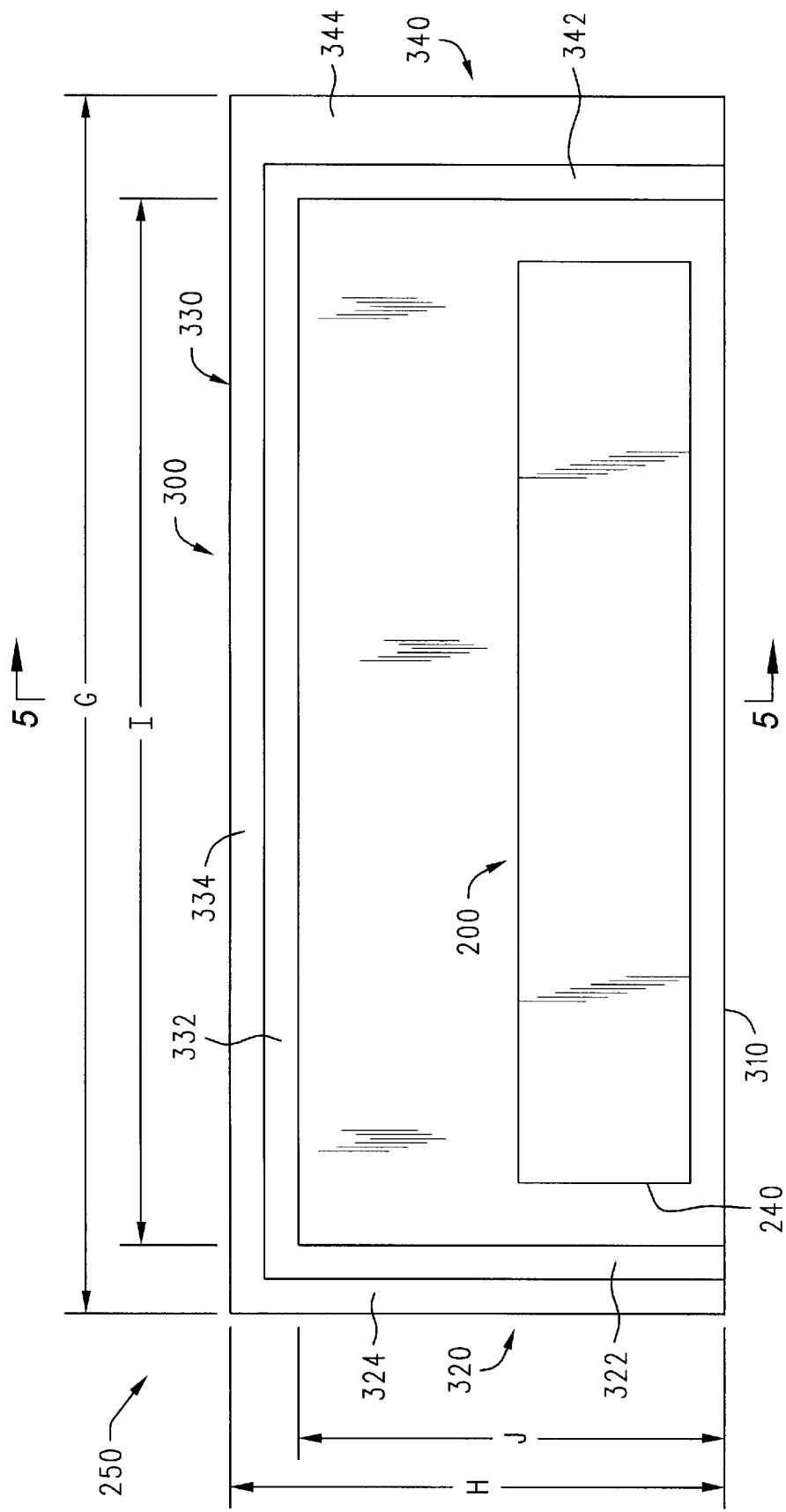
FIG. 4 is a top plan view of a pressure pouch package including the pressure pouch of FIG. 3 rolled, folded and enclosed within an outer pouch.
Figure 5:
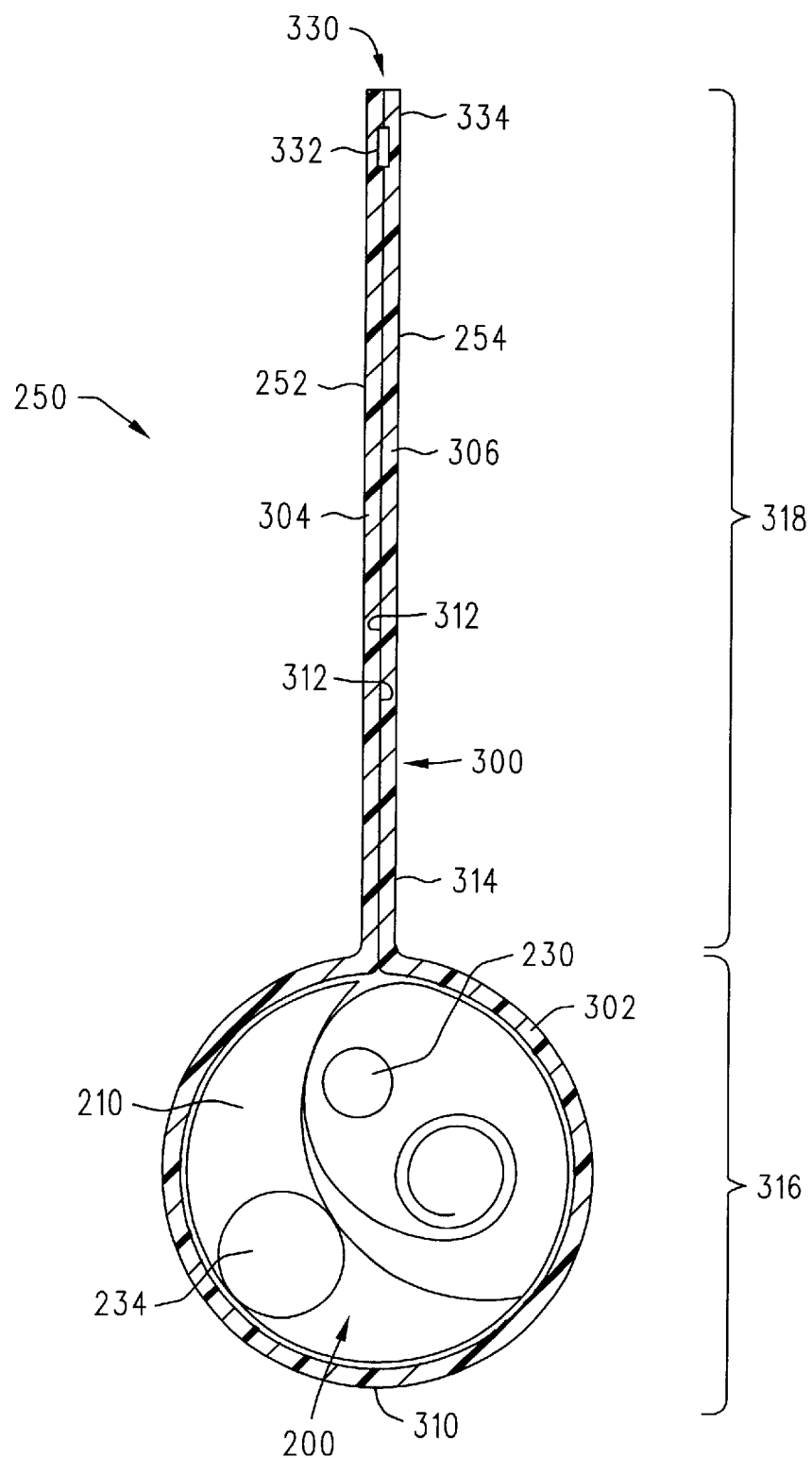
FIG. 5 is cross-sectional view of the pressure pouch package of FIG. 4 taken along the line 5—5 of FIG. 4.

FIG. 4 illustrates a pressure pouch package 250. FIG. 5 is an enlarged cross-sectional view of the pressure pouch package 250, taken along the line 5—5 in FIG. 4. Referring now to FIGS. 4 and 5, pressure pouch package 250 may include the pressure pouch 200, previously described, enclosed within an outer pouch 300 as shown. The pressure pouch 200 may be in a folded and rolled configuration as will be described in further detail herein. Outer pouch 300 may, for example, be formed from a single sheet 302, FIG. 5, of plastic material having a first surface 312 and an oppositely disposed second surface 314. To form the outer pouch 300, the single sheet 302 of plastic material may first be folded around the pressure pouch 200, forming a folded edge 310, as best shown in FIG. 4. The edge 310 essentially divides the sheet 302 into two sections 304, 306, FIG. 5. Pressure pouch package 250 may generally have a top surface 252 formed on the section 304 and a bottom surface 254 formed on the section 306, FIG. 5.

Referring to FIG. 4, to seal the edges 320, 330 and 340 of the outer pouch 300, the sheet 302 may be releasably sealed to itself via peelable seams. Specifically, the edge 320 may be sealed via a peelable seam 322, the edge 330 may be sealed via a peelable seam 20 332 and the edge 340 may be sealed via a peelable seam 342. Each of the peelable seams 322, 332 and 342 may, for example, have a thickness of about 0.25 1inches. As shown in FIG. 4, the peelable seams 322, 332 and 342 may overlap such that a continuous peelable seam is formed, thus completely sealing the pressure pouch 200 within the outer pouch 300.

The peelable seams 322, 332, 342 may be formed in any conventional manner. The seams 322, 332, 342 may, for example, be formed such that they have a seam strength of between about 3 and about 4 pounds per linear inch. In other words, a force equal to between about 3 and about 4 pounds per linear inch of the seam must be supplied in order to peel the seams.

In general, the strength of peelable seams can be controlled by varying the type and/or amount of sealant material that is used in the plastic film used to form the seams. As an example, many plastic films use polyethylene as the sealant component when it is laminated or extruded with other polymers to form a film structure. This type of "sandwich" structure is necessary if polyethylene alone lacks the physical properties required for the particular application.

A permanent or "lock up" seam may be produced by providing a relatively thick (e.g., 0.002 inch to 0.003 inch) layer of polyethylene. A 0.002 inch thick layer of polyethylene, for example, might produce a seam having a strength of about 10 pounds per linear inch.

A peelable seam may be produced by providing a relatively thinner layer of polyethylene. Reducing the thickness of the polyethylene layer to about 0.0005 inch may, for example, produce a peelable seam having a strength of between about 3 and 4 pounds per linear inch.

The values noted above are cited by way of example only. Other factors, such as the temperature at which the seams are formed and the time for which the temperature is applied can also affect seam strength. In addition, the use of sealant materials other than polyethylene will impact seam strength. Further, other elements in the structure of the plastic sheet may impact seam strength as well.

As described above, the peelable seams 322, 332, 342 may have a seam strength of between about 3 and about 4 pounds per linear inch. To form such seams in the preferred material used to form the outer pouch 300 (as will be described in further detail herein), a temperature of about 150 degrees, F. may be applied for about 1.5 seconds.

When forming the peelable seams 322, 332, 342, the seams 322 and 332 may be formed first. A vacuum may be applied to the interior of the outer pouch 300 and, thereafter, the final peelable seam 342 may be formed. This vacuum may be applied in any conventional manner.

As an example, a tube may inserted part way into the outer pouch 300 and a vacuum applied to the tube. This process evacuates the majority of the air from the outer pouch 300 and collapses the outer pouch 300 material onto the pressure pouch. A seal may then be made between the end of the vacuum tube and the pressure pouch 200. Alternatively, pressure pouch package 250 may be formed within a chamber where a vacuum is applied.

Referring to FIG. 5, the vacuum described above causes the first surface 312 of the sheet 302 to be in contact with the pressure pouch 200 in the area 316 where the pressure pouch 200 is present. In the area 318 where the pressure pouch 200 is not present, however, the vacuum causes the first surface 312 of the sheet 302 to be in contact with itself as shown.

Referring again to FIG. 4, an unsealed edge area 324 may extend outwardly of the peelable seam 322, an unsealed edge area 334 may extend outwardly of the peelable seam 332 and an unsealed edge area 344 may extend outwardly of the peelable seam 342. Unsealed edge areas 324 and 334 may each have width of about 0.25 inch. Unsealed edge area 344 may be provided having a larger width in order to facilitate robotic handling of the pressure pouch package 250 in a manner as will be described in further detail herein. The unsealed edge area 344 may, for example, have a width of about 0.5 inch.

The outer pouch 300 may have an overall length "G" and an overall width "H", FIG. 4. The outer pouch 300 may have an interior length "I", extending between the peelable seams 322 and 342 and an interior width "J", extending between the peelable seam 332 and the folded edge 310. The length "G" may, for example, be about 12.25 inches. The width "H" may, for example, be about 4.875 inches. The length "I" may, for example, be about 11 inches. The width "J" may, for example, be about 4.375 inches.

An exemplary method of manufacturing the pressure pouch package 250 will now be described in detail. First, with reference to FIG. 3, the pressure pouch 200 may be folded about a fold line 240. Specifically, the pressure pouch 200 may be folded about the fold line 240 such that the upper portion 244 of the pouch 200 is folded behind the lower portion 246, as viewed in FIGS. 3 and 6. Folded in this manner, the pouch 200 is now short enough to fit within a dispensing container, such as the dispensing container 410 illustrated in FIG. 8. Fold line 240 may, for example, be located a distance "F", FIG. 3, of about 10.75 inches from the lower edge 202 of the pouch 200. Further, the fold line 240 may be substantially parallel to the lower edge 202.

Figure 6:
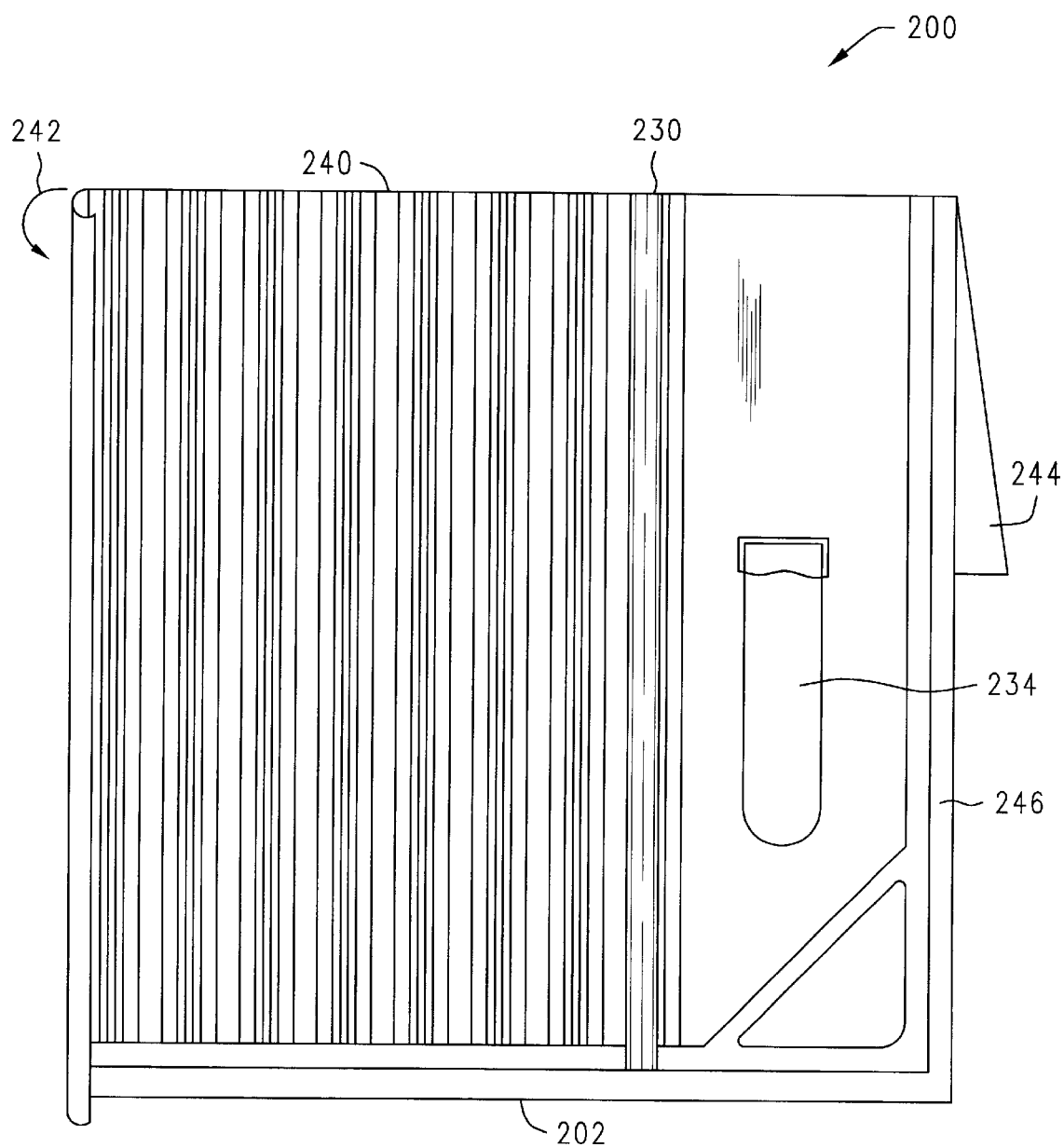
FIG. 6 is a top perspective view of the pressure pouch of FIG. 3 at a stage in which it is folded and partially rolled.
Figure 7:
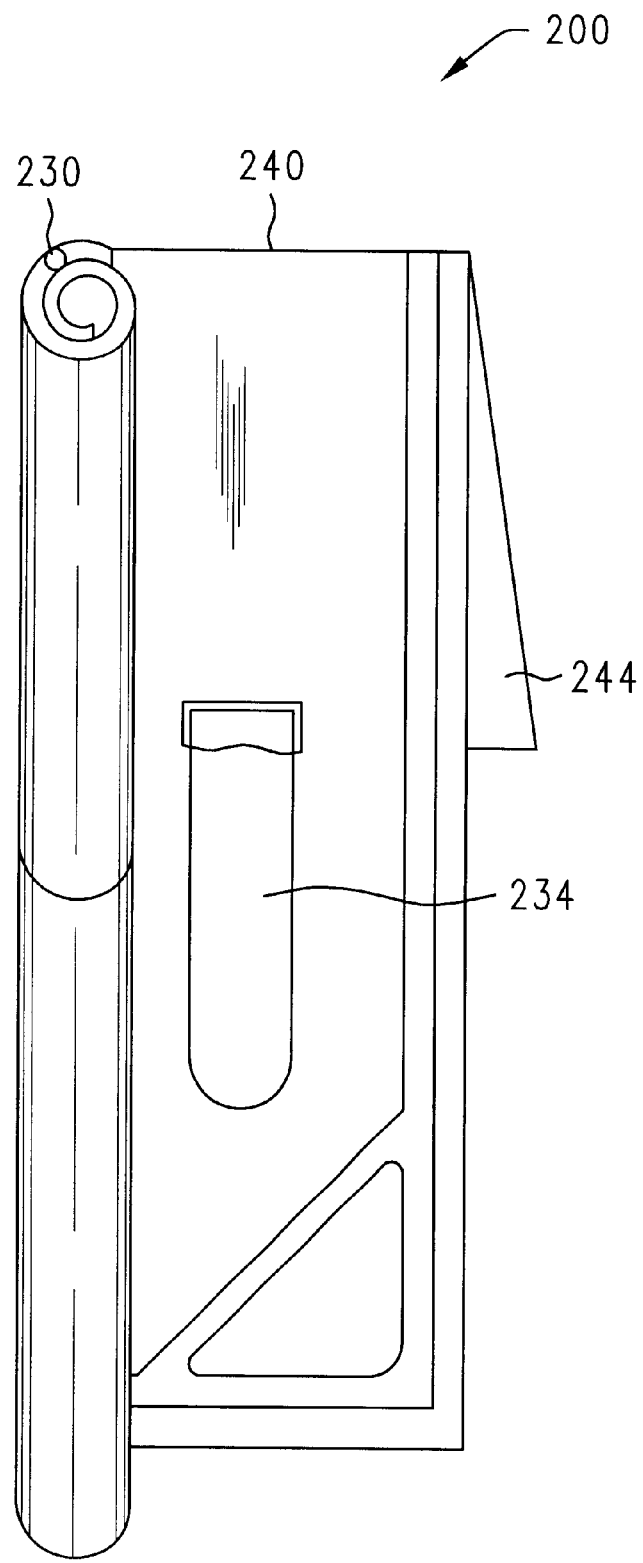
FIG. 7 is a top perspective view of the pressure pouch of FIG. 3 at a stage in which it is further rolled relative to FIG. 6.

After the pressure pouch 200 is folded about the fold line 240, it may be rolled into a compact configuration. The beginning of the pressure pouch rolling process is illustrated in FIG. 6. The rolling process may begin in the area of the compartment 228, FIG. 3, as illustrated by the arrow 242 in FIG. 6. An intermediate phase in the rolling process is illustrated in FIG. 7. The pressure pouch 200 may be sterilized in any conventional manner before or after it is folded and rolled. After the pressure pouch 200 is sterilized and completely rolled up, the outer pouch 300 may be formed around it as described above.

It is noted that the method of manufacturing the pressure pouch package 250 described herein has been provided for exemplary purposes only. As an alternative, the outer pouch 300 could be initially formed having two peelable seams in place, e.g., the seams 332, 342, FIG. 4. The pressure pouch 200 may then be sterilized, folded and rolled as previously described and inserted into the outer pouch 300 through the open edge 320. A vacuum may then be pulled on the outer pouch 300 and the final seam 322 formed.

It is further noted that the seams 322, 332, 342 have been described herein as peelable seams for exemplary purposes only. Although the use of peelable seams is preferred, their use is not necessarily essential to proper operation of the pressure pouch package 250. The seams 322, 332, 342 could, alternatively be formed having any structure which allows them to open under a preselected condition, as will be further described herein. The seams 322, 332, 342 could, for example, alternatively be formed as frangible wall members. Further, the outer pouch 300 could, alternatively, be formed from two sheets rather than from a single sheet of material. To form the outer pouch 300 from two sheets of material, a permanent seam could be provided in place of the folded edge 310 previously described.

FIG. 8 illustrates a dispensing system 400. Dispensing system 400 may include a dispensing container 410, as previously described, a closure device 420 sealing the container 410, a quantity of liquid 412 within the container 410 and the pressure pouch package 250 immersed within the liquid 412. Closure device 420 may, for example, be a dispensing valve assembly. The liquid 412 may, for example, be a carbonated beverage such as beer.

Figure 9:
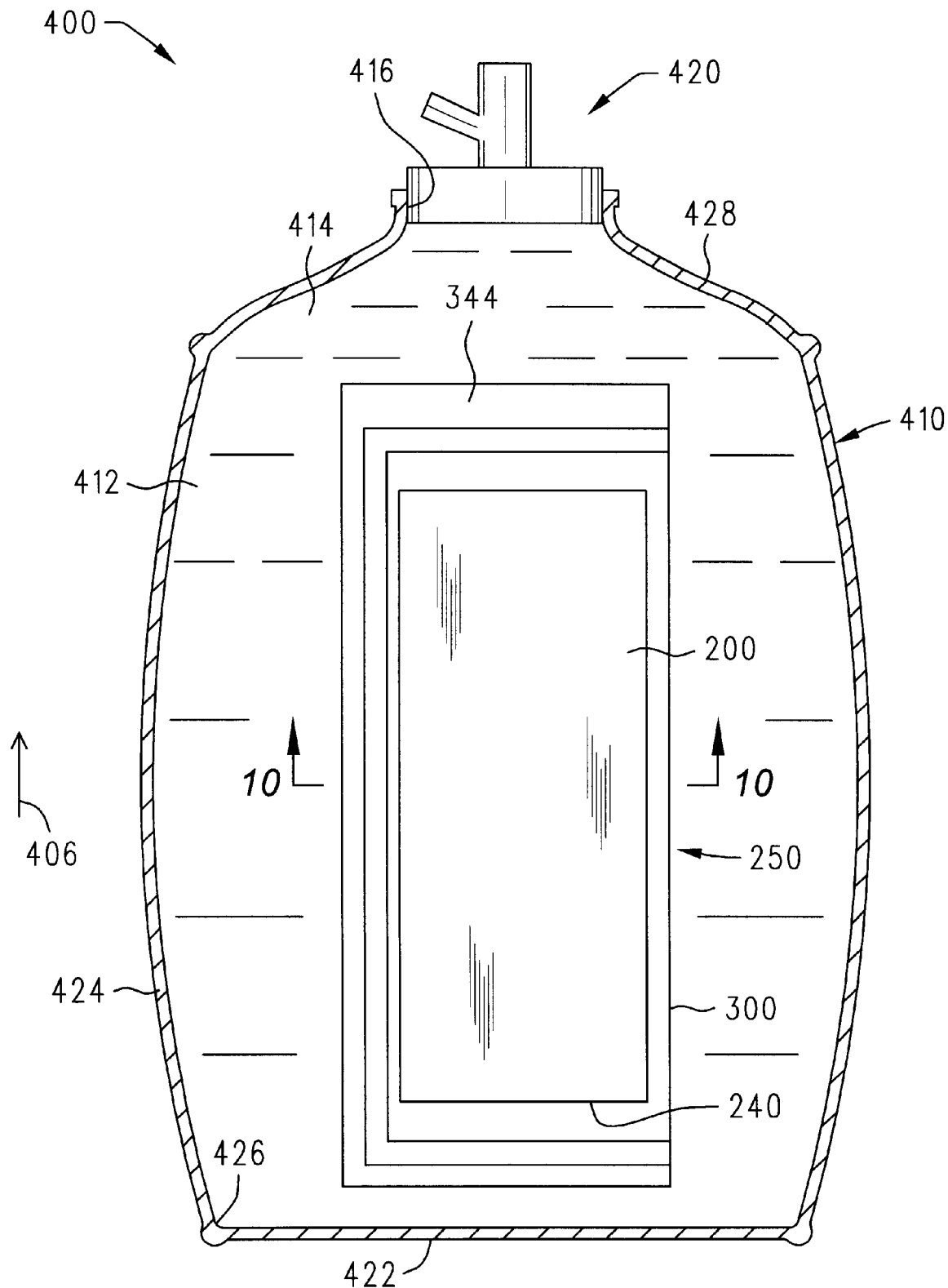
FIG. 9 is a view similar to FIG. 8 but showing the improved dispensing system after the pressure pouch has been activated and before any product has been dispensed from the container.
Figure 10:
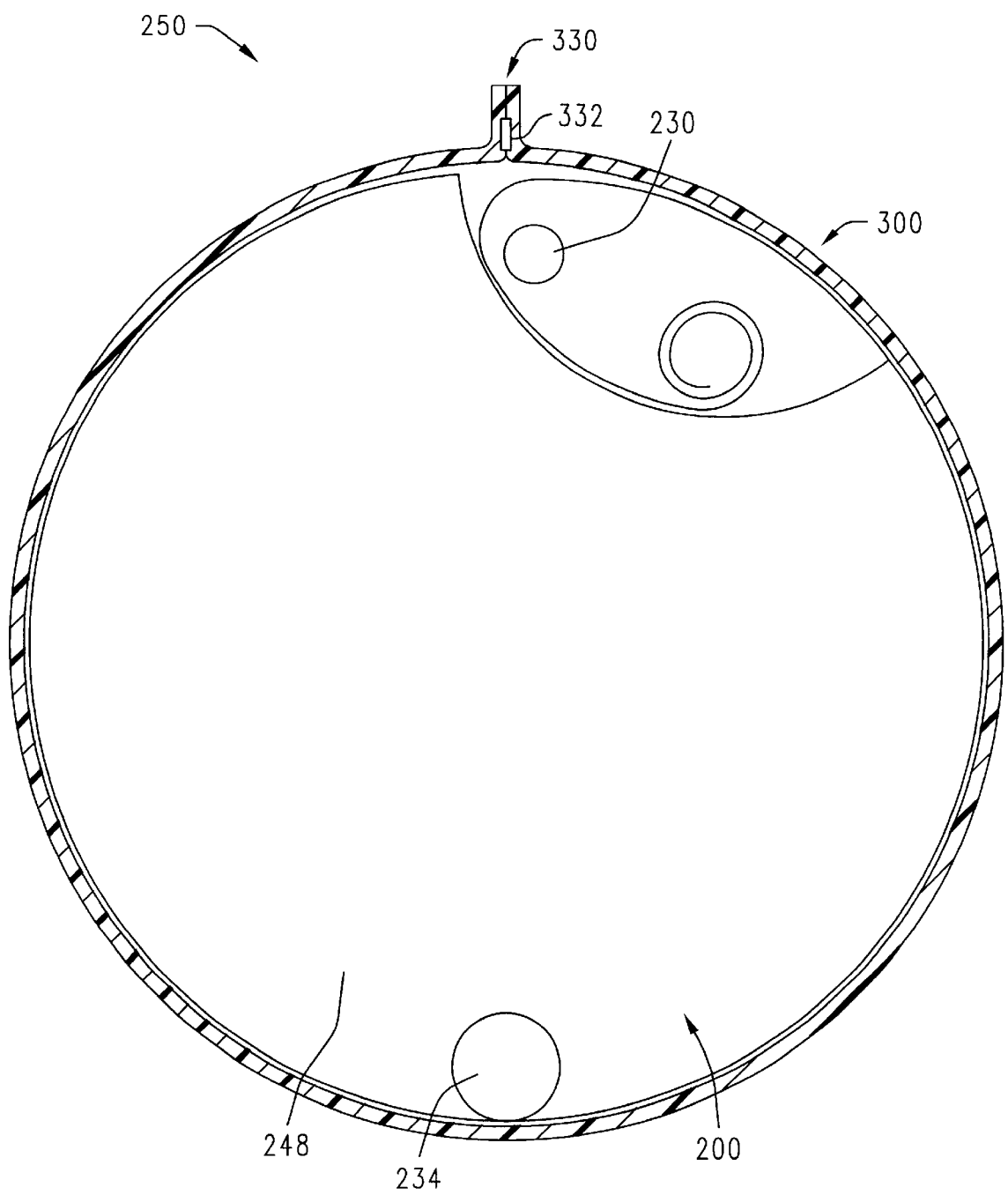
FIG. 10 is a partial cross-sectional view taken along the line 10—10 in FIG. 9.
Figure 11:
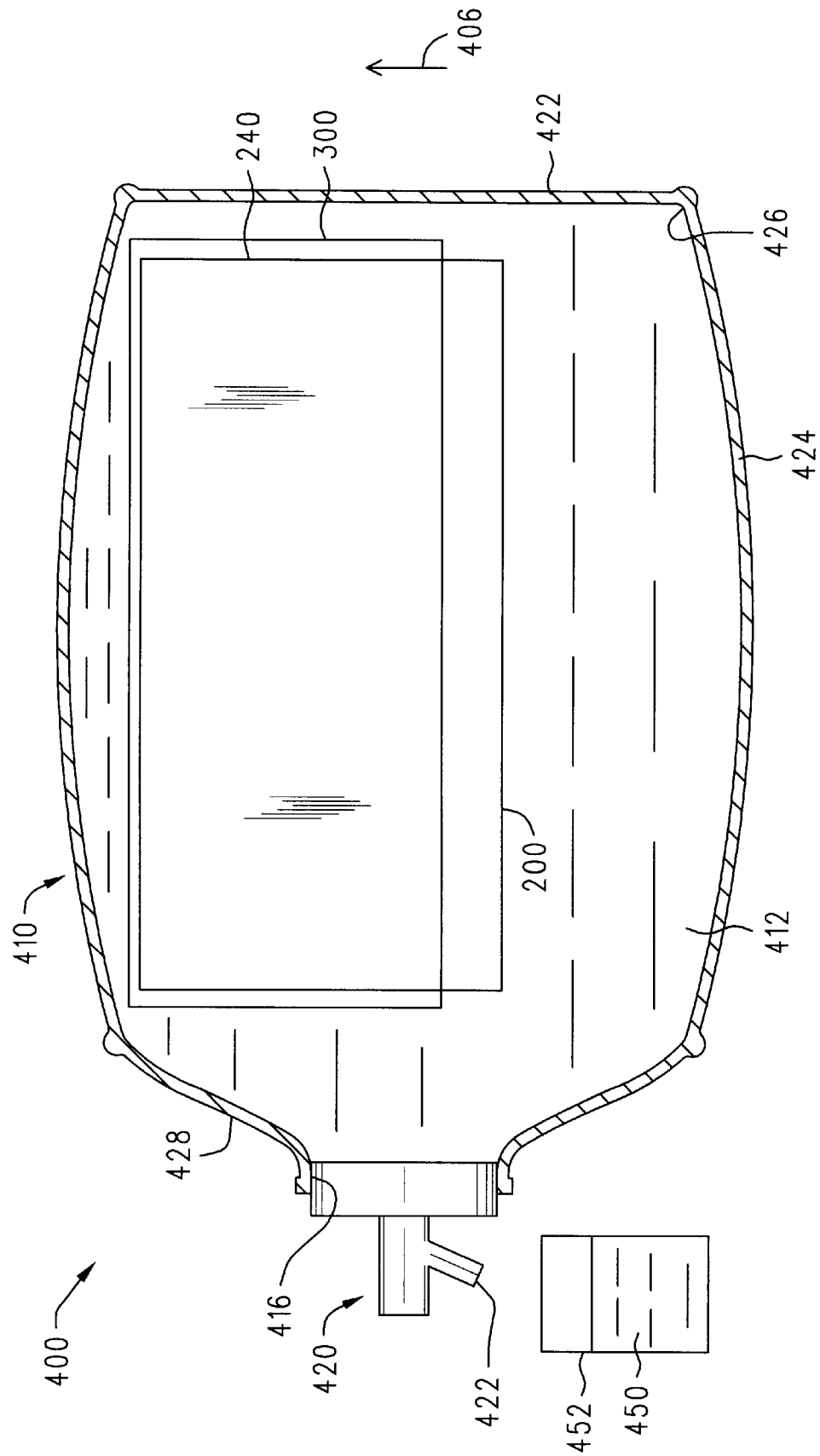
FIG. 11 is a view similar to FIGS. 8 and 9 but showing the improved dispensing system after a quantity of product has been dispensed from the container.

FIGS. 8–10 illustrate the dispensing system 400 at various stages of the filling operation, e.g., before the dispensing system is shipped to a consumer for use or to a retailer or wholesaler for sale. As described previously, filling operations typically are carried out with the container 410 in a vertical orientation, i.e., with the container opening 416 facing in an upward direction. The vertical direction is indicated in FIGS. 8, 9 and 11 by the reference numeral 406.

To begin the filling operation, the container 410, FIG. 8, may first be filled with the liquid 412 to be dispensed. The pressure pouch package 250 may then be inserted into the container 410 through the container opening 416. Alternatively, the pressure pouch package 250 may be inserted before the liquid 412 is filled into the container 410. The pressure pouch package 250 may, for example, be inserted by hand. Alternatively, a mechanized, robotic system may be used to insert the pressure pouch package into the container. As previously described, the edge 344 of the outer pouch 300, FIG. 4, may be provided having a relatively large width to facilitate grasping by a such a mechanized robotic system. Alternatively, any other type of robotic system may be used, for example, a robotic system using suction cups to grasp the pressure pouch package 250. After the liquid 412 and pressure pouch package 250 have been inserted into the container 410, the opening 416 of the container 410 may be sealed with the closure member 420.

As can be seen from FIG. 8, the pressure pouch package 250 has been inserted into the container 410 such that the pressure pouch fold line 240 is located toward the bottom 422 of the container 410. As previously described, this orientation facilitates expansion of the pressure pouch 200 into the corner areas 426 of the container 410.

FIG. 8 illustrates the dispensing system 400 after the above steps have been completed, i.e., after the container 410 has been filled and sealed, but before the pressure pouch 200 has been activated. Accordingly, the pressure pouch package 250 in FIG. 8 may be in substantially the condition depicted in FIGS. 4 and 5. As can be seen from FIG. 8, the volume of liquid 412 in the container 410 is less than the total volume of the container 410. Accordingly, a headspace 414 may exist above the liquid 412. The headspace 414 may, for example, primarily comprise carbon dioxide gas.

FIG. 9 illustrates the dispensing system 400 after the pressure pouch 200 has been activated. FIG. 10 is a cross-sectional view of the pressure pouch package 250 taken along the line 10—10 in FIG. 9. With reference to FIGS. 9 and 10, it can be seen that the trigger 234 has been activated, thus causing the second reactive component initially housed within the trigger 234 to react with the first reactive component in the pressure pouch first compartment 210. In addition, secondary pouch compartment 214 may also be opened, thus allowing the second reactive component initially housed within the secondary compartment 214 to also react with the first reactive component initially housed within the pouch first compartment 210. Accordingly, the previously separate compartments 210 and 214 may now be combined into a single compartment 248 as shown in FIG. 10. Further, the headspace 414, FIG. 8, previously existing in the container has been bled off or dissolved into the liquid 412 in a manner as previously described. Accordingly, in FIG. 9, the pressure pouch package 250 has increased in volume, relative to the condition shown in FIG. 8, by an amount equal to the volume of the previously existing headspace 414, FIG. 8.

As can be seen from FIGS. 9 and 10, although the pressure pouch 200 is activated, and thus applying pressure to the liquid 412, the outer pouch is still intact. In other words, the peelable seams 322, 332, 342, FIG. 4, remain intact such that the pressure pouch 200 remains sealed within the outer pouch 300. To ensure that this occurs, the available volume of the outer pouch 300 may be chosen to be slightly greater than the initial headspace of the container 410. The initial headspace of the container 410 may, for example, be calculated as the total interior volume of the container 410 (with the closure member 420 in place) minus the volume of liquid 412 to be placed in the container 410. An "excess outer pouch volume", thus, may be calculated as the available volume of the outer pouch 300 minus the initial headspace of the container.

The container 410 may, for example, have a total interior volume (with the closure member 420 in place) of about 5.6 liters. The volume of liquid 412 placed in the container 410 may, for example, be about 5.1 liters.

Accordingly, the container 410 may, for example, have an initial headspace of about 0.5 liter. The dimensions previously described, with respect to FIG. 4, for the pressure pouch package 250 result in an available outer pouch volume of about 0.6 liter, which is slightly larger than the dispensing container initial headspace of 0.5 liter, as described above. Accordingly, none of the peelable seams 322, 332, 342 of the outer pouch 300 will open when the pressure pouch 200 is initially activated. Given the example dimensions set forth above, the excess outer pouch volume (i.e., the available volume of the outer pouch minus the initial headspace of the container) will be about 0.1 liter. Accordingly, this indicates that the peelable seams of the outer pouch will be forced open only after a volume of liquid equal to about 0.1 liter is dispensed from the dispensing system 400.

It is noted that, in FIGS. 8 and 9, the pressure pouch system 250 is shown in a relatively central vertical position relative to the container 410 for illustration purposes only. In actual use, the pressure pouch system 250 would tend to float and may, thus, actually be in contact with the closure device 420.

FIG. 11 illustrates the dispensing system 400 in its horizontal dispensing orientation, i.e., with the container opening 416 facing in a horizontal direction. Specifically, FIG. 11 illustrates the dispensing system 400 after a quantity of the liquid 412 has been dispensed from the container 410, for example, by an end user of the dispensing system 400. Specifically, a quantity 450 of the liquid 412 has been dispensed through the dispensing opening 422 of the closure member 420, for example, into a receptacle such as a drinking glass 452. Further, in the condition illustrated in FIG. 11, the volume of the dispensed quantity 450 exceeds the excess outer pouch volume, as described above. Accordingly, the pressure pouch 200 has now expanded sufficiently to open at least the peelable seam 332. With additional dispensing, the pressure pouch 200 will continue to expand, thus causing the seams 322 and 342 to also eventually open.

The pressure pouch 200, thus, is now in direct contact with the liquid 412 and is no longer sealed within the outer pouch 300. From this point on, as further liquid is dispensed from the dispensing system 400, the pressure pouch 200 may expand in a conventional fashion, with additional pressure pouch compartments 212 opening periodically to allow more reactive components to mix and, thus, generate more gas.

As described previously, reactive component within a pressure pouch can become trapped by the pressure pouch fold, such as the fold 240 described with respect to the pressure pouch 200. This entrapment, however, is generally not possible when the pouch is in a tightly folded configuration. Further, as also described previously, the entrapment problem can be alleviated if the pressure pouch is maintained in its tightly folded configuration until the container is turned to its horizontal dispensing orientation.

As can be appreciated, the pressure pouch system 250 previously described serves to maintain the pressure pouch 200 in its tightly folded configuration until the container is turned to the horizontal dispensing orientation. Specifically, since the peelable seams 322, 332, 342 of the outer pouch 300 cannot open until a quantity of liquid 412 is dispensed from the container 410, the outer pouch 300 tightly constrains the pressure pouch 200 until such dispensing occurs. As also described above, such dispensing occurs with the dispensing system 400 in a horizontal orientation. Accordingly, the pressure pouch system 250 described above alleviates the reactive component entrapment problem.

The pressure pouch system 250 described herein also provides an additional benefit as will now be described in detail. Dispensing systems, such as the dispensing system 400, must be designed to protect the product, e.g., the liquid 412, and to remain operational for the total life of the dispensing system. The total life of the dispensing system may be divided into a "shelf life" and a "dispense life". For purposes of this discussion, shelf life may be defined as a time period beginning when the dispensing system is first filled with product and ending when an end user first dispenses product from the system. Dispense life may be defined as a time period beginning when an end user first dispenses product from the system and ending when the last of the product is dispensed from the system. Typically, dispensing systems are designed having a shelf life which is substantially longer than the dispense life. A typical design shelf life may, for example, be about six months, while a typical design dispense life may, for example, be about three weeks.

In a pressure pouch dispensing system, it is important to prevent excessive amounts of gas generated within the pressure pouch (e.g., carbon dioxide gas) from migrating into the product. The amount of gas that will migrate through the walls of the pressure pouch is a function of the material from which the pouch is formed and of the amount of time that the pressure pouch is in contact with the product. In a conventional pressure pouch dispensing system, the pressure pouch remains in contact with the product for a relatively long time, i.e., for the total life of the dispensing system. Accordingly, it is generally necessary to construct conventional pressure pouches of materials having relatively high barrier properties. The use of such high barrier property materials adds cost and complexity to the pressure pouch structure.

Using the pressure pouch package 250 described herein, however, the pressure pouch 200 only comes into direct contact with the product (liquid 412) after a quantity of liquid is first dispensed from the container 410. Accordingly, the pressure pouch 200 directly contacts the liquid 412 only during the dispense life of the dispensing system 400 and not during the longer shelf life of the dispensing system. During the shelf life of the dispensing system, only the outer pouch 300 is in direct contact with the product. Accordingly, in the pressure pouch system 250 described herein, the barrier property function built into prior pressure pouches may be predominantly shifted to the outer pouch 300. In other words, in the pressure pouch system 250, barrier properties may be supplied by the outer pouch 300 rather than by the pressure pouch 200. This is advantageous since the outer pouch 300 has a smaller area than the pressure pouch 200 and the amount of relatively expensive gas barrier material needed may, thus, be reduced.

Shifting the gas barrier properties to the outer pouch 300 is further advantageous in that the outer pouch 300 has a simpler structure relative to the pressure pouch 200. Accordingly, it is easier to incorporate the gas barrier properties into the outer pouch 300 than into the pressure pouch 200. Unlike most pressure pouches, the outer pouch 300 does not, for example, require printing, chemical insertion or many other complicating factors associated with pressure pouch formation.

A prior pressure pouch (e.g., the type disclosed in U.S. Pat. No. 5,769,282, previously referenced) might, for example, be formed from a laminated material having a PVDC layer sandwiched between a PET layer and a PE layer. This type of material provides high barrier properties such that a pressure pouch formed from the material can remain in contact with product to be dispensed for a substantial period of time.

The present pressure pouch 200, however, may be formed from a relatively simpler, and less costly, material because, as described above, the pressure pouch 200 contacts the product to be dispensed for a relatively short amount of time. The material used to form the pressure pouch 200 may, for example, be formed from a material having a nylon layer located between PE layers. The material used to form the pressure pouch 200 may, thus, omit the PVDC layer required in prior pressure pouch materials. Accordingly, the material used to form the pressure pouch 200 may have a simpler and less costly structure than prior materials used for pressure pouches.

As discussed previously, the outer pouch 300 serves to provide the majority of the barrier properties for the pressure pouch system 250. Accordingly, the outer pouch 300 must be formed from a material having sufficient barrier properties. The material used to form the outer pouch 300 must also be capable of forming the peelable heat seams 322, 332, 342, FIG. 4, as previously described. Further, since the outer pouch will contact the fluid 412, the material forming the outer pouch, in the case where the fluid 412 is a food product, must be flavor compatible with the fluid. The material used to form the outer pouch 300 should preferably also be substantially non-extensible so that the peelable seams 322, 332, 342 will open under the proper conditions. The outer pouch 300 may, for example, be primarily formed of a PET material or an OPP (oriented polypropylene) material. To provide the film structure with adequate barrier properties, this material may be coated (e.g., solvent coated) on both sides with a PVDC coating, such as that commercially available under the trade name "SARAN". The surface of this structure on which peelable seams are to be formed may then be coated with a layer of PE in a manner as previously described. The PE layer may, for example, have a thickness of about 0.0005 inch.

The material used to form the outer pouch may, for example, have a total thickness of about 2 mm. It has been found that the material described above functions well and meets the outer pouch criteria set forth above.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A method for dispensing fluid from a container, said method comprising:

a) providing a quantity of said fluid in said container;
   b) providing a first openable pouch in said container and at least partially in contact with said quantity of said fluid;
   c) providing a second pouch located within said first openable pouch, said second pouch having a plurality of openable compartments containing components of an at least two-component gas generating system;
   d) dispensing some of said quantity of fluid from said container;
   e) causing said first openable pouch to open;
   f) causing at least one of said second pouch compartments to open after said causing said first openable pouch to open.

2. The method of claim 1 wherein said outer pouch is formed from a single sheet of flexible material.

3. The method of claim 1 wherein said causing said first openable pouch to open causes said second pouch to contact at least a portion of said quantity of said fluid.

4. The method of claim 1 wherein said first openable pouch includes at least one peelable seam.

5. The method of claim 4 wherein said causing said first openable pouch to open comprises causing said at least one peelable seam to open.

6. A pressure pouch package suited for use in combination with a dispensing container, said pressure pouch package comprising:

an outer pouch;

an inner pouch having at least first and second compartments and containing components of an at least two-component gas generating system;

wherein said inner pouch is located within said outer pouch;

wherein none of said components of said at least two-component gas generating system are located between said outer pouch and said inner pouch.

7. The pressure pouch package of claim 6 wherein said outer pouch is formed from a single sheet of flexible material.

8. The pressure pouch package of claim 6 wherein a vacuum exists between said inner and said outer pouches.

9. The pressure pouch package of claim 6 wherein said outer pouch includes at least one openable portion therein.

10. The pressure pouch package of claim 9 wherein said at least one openable portion comprises at least one peelable seam.

11. A pressure pouch package suited for use in combination with a dispensing container, said pressure pouch package comprising:

an outer pouch;

an inner pouch having at least first and second compartments and containing components of an at least two-component gas generating system;

wherein said inner pouch is located within said outer pouch;

wherein said outer pouch is formed from at least one first material;

wherein said inner pouch is formed from at least one second material;

wherein said at least one first material has a greater ability to inhibit the migration of gas thereacross than does said at least one second material.

12. The pressure pouch package of claim 11 wherein said at least one first material has a greater ability to inhibit the migration of carbon dioxide gas thereacross than does said at least one second material.

13. The pressure pouch package of claim 11 wherein said outer pouch is formed from a single sheet of flexible material.

14. The pressure pouch package of claim 11 wherein a vacuum exists between said inner and said outer pouches.

15. The pressure pouch package of claim 11 wherein said outer pouch includes at least one openable portion therein.

16. The pressure pouch package of claim 15 wherein said at least one openable portion comprises at least one peelable seam.

17. A dispensing system for dispensing a fluid, said dispensing system comprising:

a) a container;

b) a quantity of said fluid in said container;

c) an openable outer pouch in said container and at least partially in contact with said quantity of said fluid;

d) an inner pouch, said inner pouch having a plurality of openable compartments containing components of an at least two-component gas generating system;

e) wherein said dispensing system includes at least a first operating condition and a second operating condition;

f) wherein, in said first operating condition:
said outer pouch is in a closed condition; and
said inner pouch is sealed within said outer pouch;

g) wherein in said second operating condition
said outer pouch is in an open condition; and
at least one of said inner pouch compartments is in an unopened condition.

18. The dispensing system of claim 17 wherein said outer pouch is formed from a single sheet of flexible material.

19. The dispensing system of claim 17 wherein said outer pouch is sealed within said container.

20. The dispensing system of claim 17 wherein, in said first condition, a vacuum exists between said inner and said outer pouches.

21. The dispensing system of claim 17 wherein:

in said first operating condition, said inner pouch is not in contact with said quantity of said fluid; and in said second operating condition, said inner pouch is at least partially in contact with said quantity of said fluid.

22. The dispensing system of claim 17 wherein, in said first operating condition, said outer pouch includes at least one peelable seam.

23. The dispensing system of claim 22 wherein, in said second operating condition, said at least one peelable seam is separated.

* * * * *

UNITED STATES PATENT AND TRADEMARK OFFICE
CERTIFICATE OF CORRECTION

PATENT NO. : 6,244,465 B1
DATED : June 12, 2001
INVENTOR(S) : Lane et al.

Page 1 of 1

It is certified that error appears in the above-identified patent and that said Letters Patent is hereby corrected as shown below:

Column 2,
Line 57, after "opening." do not begin a new paragraph

Column 10,
Line 37, after "seam" delete "20"
Line 40, delete "1inches" and insert therefor -- inches --

Column 11,
Line 19, after "manner" do not begin a new paragraph
Line 20, after "may" insert -- be --

Column 16,
Line 28, delete ""SARAN"" and insert therefor -- "SERAN" --

Signed and Sealed this

Sixteenth Day of April, 2002

Attest:

Attesting Officer

JAMES E. ROGAN
Director of the United States Patent and Trademark Office